(12) United States Patent
Tanaka et al.

(10) Patent No.: US 12,637,138 B2
(45) Date of Patent: May 26, 2026

(54) INPUT/OUTPUT DEVICE AND STEERING MEASUREMENT DEVICE

(71) Applicant: Mitsubishi Electric Corporation, Tokyo (JP)

(72) Inventors: Kenta Tanaka, Tokyo (JP); Takahiro Homma, Tokyo (JP); Isao Kezobo, Tokyo (JP); Akihiko Hashimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 79 days.

(21) Appl. No.: 18/857,225

(22) PCT Filed: Apr. 27, 2022

(86) PCT No.: PCT/JP2022/019027
§ 371 (c)(1),
(2) Date: Oct. 16, 2024

(87) PCT Pub. No.: WO2023/209845
PCT Pub. Date: Nov. 2, 2023

(65) Prior Publication Data
US 2025/0263115 A1 Aug. 21, 2025

(51) Int. Cl.
*B62D 5/04* (2006.01)
*G01M 17/06* (2006.01)

(52) U.S. Cl.
CPC ........... *B62D 5/0481* (2013.01); *B62D 5/046* (2013.01); *B62D 5/0463* (2013.01); *G01M 17/06* (2013.01)

(58) Field of Classification Search
CPC .... B62D 5/0457; B62D 5/0481; B62D 5/046; B62D 5/0463; G01M 17/06
See application file for complete search history.

(56) References Cited

U.S. PATENT DOCUMENTS

| | | | |
|---|---|---|---|
| 11,084,526 B2* | 8/2021 | Yu | B62D 15/022 |
| 11,208,142 B2* | 12/2021 | Kim | B62D 6/008 |
| 2017/0080970 A1 | 3/2017 | Kezobo et al. | |
| 2020/0290625 A1 | 9/2020 | Berntorp et al. | |

FOREIGN PATENT DOCUMENTS

JP 6129409 B2 5/2017

OTHER PUBLICATIONS

Extended European Search Report dated May 22, 2025 from the European Patent Office in Application No. 22940125.2.

* cited by examiner

*Primary Examiner* — Erick R Solis
(74) *Attorney, Agent, or Firm* — Sughrue Mion, PLLC

(57) ABSTRACT

An input/output device includes: an identification signal command unit that outputs, to an electric power steering device that adds a steering assist force to a steering provided in a vehicle, an identification signal for identifying a parameter of the electric power steering device, or an instruction signal that instructs the electric power steering device to start outputting the identification signal; and a parameter identification unit that identifies the parameter of the electric power steering device from a response of the electric power steering device to the identification signal, in which the parameter identification unit identifies the parameter of the electric power steering device based on a response to a first identification signal for identifying a linear parameter and a second identification signal for identifying a nonlinear parameter, which are output when the steering is in a predetermined rotation state.

10 Claims, 7 Drawing Sheets

FIG. 4

INPUT/OUTPUT DEVICE AND STEERING MEASUREMENT DEVICE

CROSS REFERENCE TO RELATED APPLICATIONS

This application is a National Stage of International Application No. PCT/JP2022/019027 filed Apr. 27, 2022.

TECHNICAL FIELD

The present disclosure relates to an input/output device and a steering measurement device.

BACKGROUND ART

An electric power steering device includes a motor that generates a steering assist torque for steering, and a control device that controls the motor, and adds a steering assist force to a steering mechanism of a vehicle such as an automobile. The steering measurement device is a device for conducting a measurement test for identifying mechanical constants of the electric power steering device.

Patent Document 1 discloses an example of a steering measurement device in the related art. In this steering measurement device, a random number or a sine sweep-shaped excitation signal is applied to an electric power steering device to excite a steering, and mechanical constants such as inertia, viscosity, and stiffness of the electric power steering device are calculated based on a response thus obtained.

CITATION LIST

Patent Documents

Patent Document 1: Japanese Patent No. 6129409

SUMMARY OF INVENTION

Problem to be Solved by the Invention

However, in the steering measurement device disclosed in Patent Document 1, only the mechanical constant having a characteristic in which the response signal to the input signal is linear can be identified among the mechanical constants of the electric power steering device. Here, a steering mechanism of the electric power steering device has a nonlinear element having a characteristic in which the response signal to the input signal is nonlinear. Examples of the nonlinear element include a friction element.

In a case where performance of the electric power steering device is evaluated by a desk-based analysis, a highly accurate model of the electric power steering device is required. In the steering measurement device disclosed in Patent Document 1, the friction element, which is a nonlinear element, cannot be identified. Therefore, in the related art, there is a problem in that the accuracy of evaluation is reduced due to an error in modeling of the electric power steering device.

The present disclosure has been made in view of the above circumstances, and an object of the present disclosure is to provide an input/output device and a steering measurement device capable of identifying a nonlinear parameter that has not been identified by a method in the related art with high accuracy, in addition to a linear parameter that has been identified by a method in the related art.

Means to Solve the Problem

In order to solve the above-described problem, an input/output device according to an aspect of the present disclosure includes: an identification signal command unit configured to output, to an electric power steering device that adds a steering assist force to a steering provided in a vehicle, an identification signal for identifying a parameter of the electric power steering device, or an instruction signal that instructs the electric power steering device to start outputting the identification signal; and a parameter identification unit configured to identify the parameter of the electric power steering device from a response of the electric power steering device to the identification signal, in which the parameter identification unit identifies the parameter of the electric power steering device based on a response to a first identification signal for identifying a linear parameter and a second identification signal for identifying a nonlinear parameter, which are output when the steering is in a predetermined rotation state.

In addition, a steering measurement device according to another aspect of the present disclosure includes: the input/output device described above; and a control device configured to be connected to the input/output device via an in-vehicle communication network provided in the vehicle, to control a rotating machine provided in the electric power steering device to add a steering assist force to the steering based on the first identification signal or the second identification signal, and to output response data indicating a response of the electric power steering device to the first identification signal or the second identification signal to the input/output device via the in-vehicle communication network.

Effects of the Invention

According to the present disclosure, there is an effect that a nonlinear parameter that has not been identified by a method in the related art can be identified with high accuracy, in addition to a linear parameter that has been identified by a method in the related art. Accordingly, mechanical characteristics of the electric power steering device can be identified with high accuracy, and an increase in accuracy of a desk-based analysis model for evaluating the characteristics of the electric power steering device can be realized.

BRIEF DESCRIPTION OF DRAWINGS

FIG. 4 A block diagram showing an internal configuration example of an identification signal command unit in the first embodiment of the present disclosure.

DESCRIPTION OF EMBODIMENTS

Hereinafter, an input/output device and a steering measurement device according to an embodiment of the present disclosure will be described in detail with reference to the drawings.

First Embodiment

Figure 1:
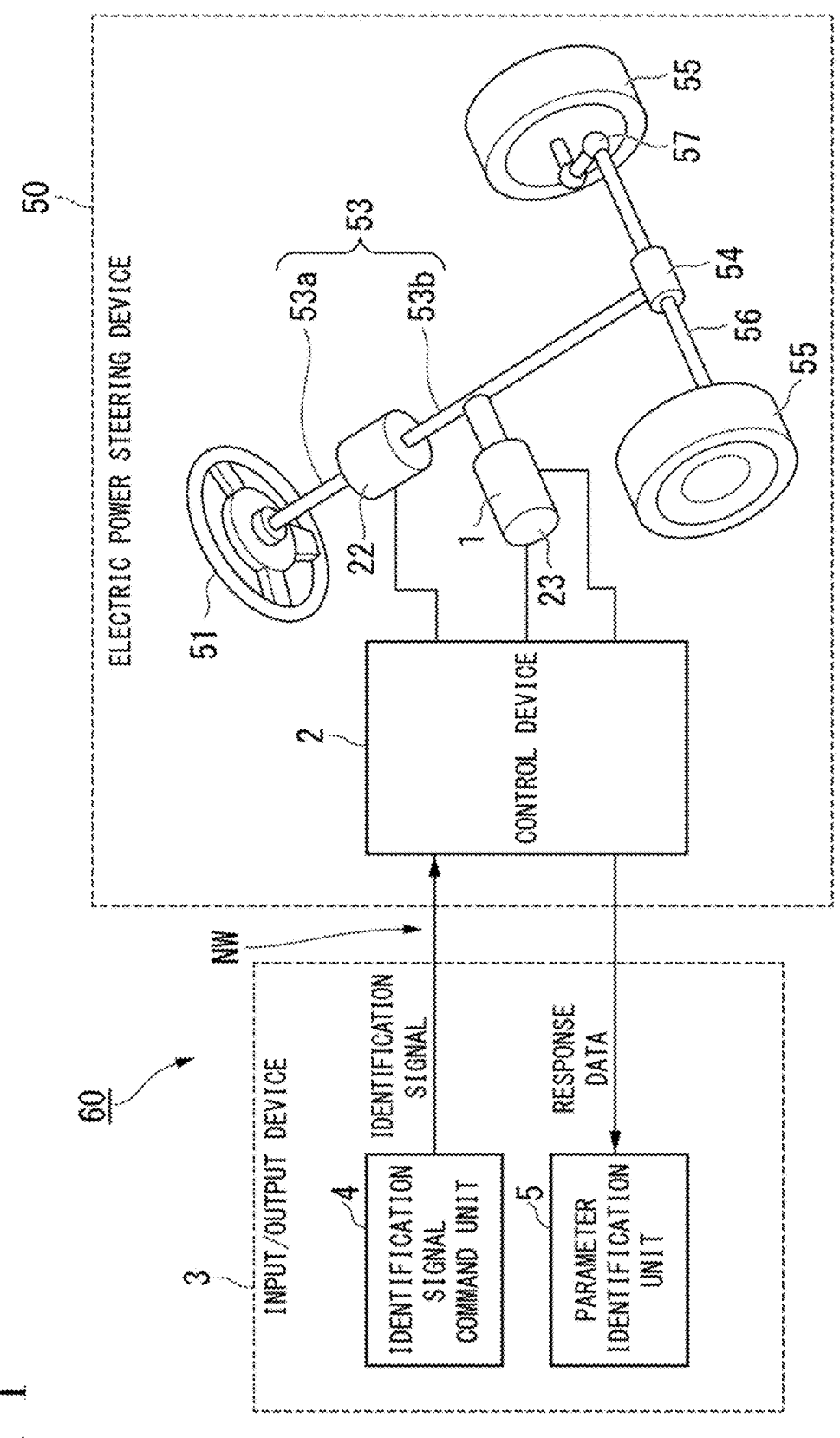
FIG. 1 A configuration diagram showing an input/output device and an electric power steering device according to a first embodiment of the present disclosure.

FIG. 1 is a configuration diagram showing an input/output device and an electric power steering device according to a first embodiment of the present disclosure. As shown in FIG. 1, an input/output device 3 according to the present embodiment includes an identification signal command unit 4 and a parameter identification unit 5. The identification signal command unit 4 outputs an identification signal based on an instruction input from the outside to start identification of a mechanical constant. The parameter identification unit 5 identifies a mechanical constant of an electric power steering device 50 based on response data of the electric power steering device 50 obtained as a response to the identification signal. As hardware constituting the input/output device 3, for example, a computer such as a tablet type computer or a notebook type computer can be used. Details of the input/output device 3 will be described later.

The electric power steering device 50 includes a steering wheel 51, a steering shaft 53, a rack and pinion gear 54, wheels 55, tie rods 56, knuckle arms 57, a torque detector 22, a rotation detector 23, a rotating machine 1, and a control device 2. A hardware configuration of the electric power steering device 50 is similar to that of an electric power steering device that has been provided in the related art, which is mounted on a vehicle and mass-produced. However, software implemented in the control device 2 is partially different from software implemented in an existing control device. Specifically, the software implemented in the control device 2 has an additional process of generating the identification signal for identifying the mechanical constant of the electric power steering device 50, compared to the software implemented in the existing control device. Details of this additional element will be described later.

The input/output device 3 and the electric power steering device 50 are connected to each other by an in-vehicle communication network NW. Transmission of the identification signal from the input/output device 3 to the electric power steering device 50 is performed via the in-vehicle communication network NW. The in-vehicle communication network NW is a communication network that is mounted in the vehicle and connects electric components mounted in the vehicle to transmit and receive data. The in-vehicle communication network NW is normally mounted in a vehicle that is mass-produced. The input/output device 3 and the control device 2 are connected to each other by using the in-vehicle communication network NW. Here, there are types of the in-vehicle communication network NW, such as a controller area network (CAN) (registered trademark), FlexRay (registered trademark), and Ethernet (registered trademark), and a cable for the in-vehicle communication network may be wired according to the type mounted in the vehicle.

The steering measurement device 60 according to the present embodiment is configured by the control device 2 provided in the electric power steering device 50 and the input/output device 3. Hereinafter, first, details of the electric power steering device 50 including the control device 2 will be described, followed by details of the steering measurement device 60 (the control device 2 and the input/output device 3).

<Electric Power Steering Device>

The steering wheel 51 is a so-called handle, and is operated by the driver (not shown) of the vehicle to provide a steering angle to the steering wheels (wheels 55) of the vehicle. The steering shaft 53 is configured by an input shaft 53*a* connected to a steering wheel 51 side and an output shaft 53*b* connected to a rack and pinion gear 54 side. The input shaft 53*a* and the output shaft 53*b* are connected to each other by a torsion bar (not shown).

The torsion bar is disposed in the torque detector 22 and passes axially through the torque detector 22. The torsion bar undergoes torsion in response to the steering torque applied to the steering wheel 51 by an operation of the driver, and the torque detector 22 detects a direction and an amount of this torsion. In the following, the steering wheel 51, the steering shaft 53, and the torsion bar will be collectively referred to as "steering".

The rack and pinion gear 54 includes a pinion gear (not shown) attached to a tip end of the output shaft 53*b* and a rack (not shown) that meshes with the pinion gear, and converts a rotational motion of the pinion gear into a reciprocating motion. The rack and the wheel 55 are connected to each other via the tie rod 56 and the knuckle arm 57.

The torque detector 22 detects the steering torque applied to the torsion bar by the driver steering the steering wheel 51. When the steering torque is applied, the torsion bar undergoes torsion that is substantially proportional to the steering torque. The torque detector 22 detects this torsional angle and converts the torsional angle into a steering torque $T_s$. The rotation detector 23 is attached to a rotating shaft of the rotating machine 1 and detects a rotation speed Om of the rotating shaft.

The rotating machine 1 generates a steering assist torque for the steering under the control of the control device 2. The rotating machine 1 is configured with, for example, an alternating current motor, such as a permanent magnet type synchronous motor or an induction motor, or a direct current motor. The control device 2 controls the rotating machine 1 based on the steering torque $T_s$ converted by the torque detector 22 and the rotation speed Om detected by the rotation detector 23 to generate the steering assist torque for the steering.

Next, an operation of the electric power steering device 50 will be described. In FIG. 1, when the steering torque is applied to the steering wheel 51 by a steering operation of the driver, the steering torque is transmitted to the rack and pinion gear 54 through the torsion bar in the torque detector 22 and the steering shaft 53. Furthermore, the steering torque is transmitted to the rack in the rack and pinion gear 54 via the rack and pinion gear 54. Then, the tie rod 56 pushes the knuckle arm 57 in the wheel 55 on one side, and the tie rod 56 pulls the knuckle arm 57 in the wheel 55 on the opposite side. As a result, a steering angle is applied to the wheels 55, and the wheels 55 are turned.

On the other hand, when the steering torque is applied to the steering wheel 51 by the steering operation of the driver, the steering torque is detected by the torque detector 22. Specifically, when the steering torque is applied, the torsion bar undergoes torsion substantially proportional to the steering torque, and the torsional angle is detected by the torque detector 22 and converted into the steering torque $T_s$. In addition, the rotation speed Om of the rotating shaft of the rotating machine 1 is detected by the rotation detector 23.

The steering torque $T_s$ converted by the torque detector 22 and the rotation speed $\omega_m$ detected by the rotation detector 23 are input to the control device 2, and a current command corresponding to the steering assist torque to be generated in the rotating machine 1 is determined according to these signals. Then, a current corresponding to the determined current command is supplied to the rotating machine 1, and the rotating machine 1 generates the steering assist torque for the steering. The steering assist torque generated by the rotating machine 1 is transmitted to the steering shaft 53 and reduces the steering torque applied by the driver during the steering operation. The electric power steering device 50 mounted in the vehicle is configured as described above, applies the steering assist force by the rotating machine 1 to the steering wheel 51, and functions as a driving assist device.

<Steering Measurement Device>

Figure 2:
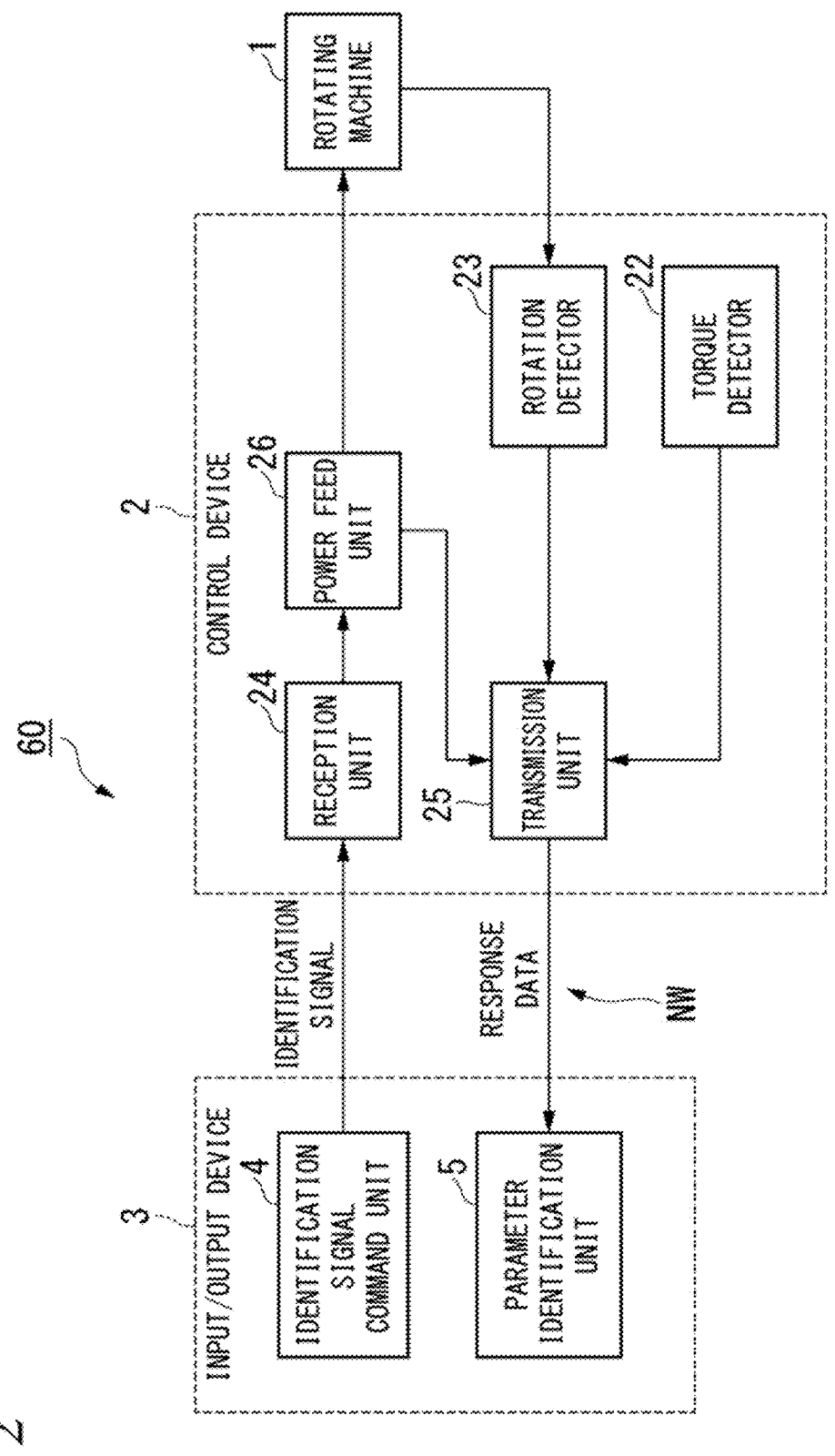
FIG. 2 A block diagram showing a configuration of a main part of the steering measurement device according to the first embodiment of the present disclosure.

FIG. 2 is a block diagram showing a configuration of a main part of the steering measurement device according to the first embodiment of the present disclosure. As shown in FIG. 2, the control device 2 includes a reception unit 24, a transmission unit 25, and a power feed unit 26 in addition to the torque detector 22 and the rotation detector 23. As shown in FIG. 1, the torque detector 22 and the rotation detector 23 are provided outside the control device 2, but are shown in FIG. 2 as a configuration inside the control device 2 for convenience.

The reception unit 24 receives the identification signal output from the input/output device 3. The power feed unit 26 applies a voltage to the rotating machine 1 based on the identification signal received by the reception unit 24. The torque detector 22 and the rotation detector 23 respectively detect the steering torque and the rotation speed, which are response data to the identification signal. The transmission unit 25 transmits the identification signal and the response data to the input/output device 3.

The steering measurement device 60 according to the present embodiment is configured to transmit and receive the identification signal and the response data between the input/output device 3 and the control device 2 via the in-vehicle communication network NW. Accordingly, a procedure necessary for identification can be performed by the control device 2 (control device 2 that controls the rotating machine 1) provided in the electric power steering device 50 as a mass-produced product, and the identification of the mechanical constant can be realized with a simple configuration.

The identification signal transmitted from the input/output device 3 to the control device 2 is a signal for generating the current command that is output from the power feed unit 26 to the rotating machine 1. The identification signal includes an identification signal (first identification signal) for identifying a linear parameter and an identification signal (second identification signal) for identifying a nonlinear parameter. Here, the linear parameter is a parameter having a characteristic in which an output signal is linear with respect to an input signal. Contrary to this, the nonlinear parameter is a parameter having a characteristic in which an output signal is nonlinear with respect to an input signal.

The input/output device 3 identifies the parameters of the electric power steering device 50 based on responses to the identification signal (first identification signal) for identifying the linear parameter and the identification signal (second identification signal) for identifying the nonlinear parameter. In the following, the identification of the linear parameter based on the response to the identification signal for identifying the linear parameter and the identification of the nonlinear parameter based on the response to the identification signal for identifying the nonlinear parameter will be sequentially described.

<<Identification of Linear Parameter>>

As the identification signal for identifying the linear parameter, a random signal such as an M-sequence signal including a predetermined power spectrum in a predetermined frequency band is used. The identification signal for identifying the linear parameter may be a sine sweep. A waveform by the sine sweep has a property that has only a single frequency component at a given time, whereas a waveform by a pseudo-random number or a random number generated by an M-sequence or the like has a property that includes a plurality of frequency components at a given time. Therefore, excitation in a wide frequency band can be achieved within a short period of time of excitation, and frequency characteristics of the steering can be efficiently acquired.

The identification signal command unit 4 performs control so that a speed sign of the steering is the same when the random signal is applied. This is to reduce an influence of an element that changes depending on a speed sign of the nonlinear parameter, which will be described later, and is particularly effective in identifying a system having a characteristic of a large friction, which is a nonlinear element. Here, examples of a method for realizing the control so that the speed sign of the steering is the same include a method of constructing a feedback control system that detects the rotation speed of the steering and adjusts a voltage applied to the rotating machine 1 so that this speed sign is not changed. In addition, a method of applying a ramp-shaped signal that changes at a constant rate with the passage of time to the rotating machine 1 can be used.

In a case where the friction, which is the nonlinear parameter, is small, or as shown in the identification method of the linear parameter described later, there are cases where the identification is performed based on response data of a region in which an influence of the nonlinear parameter is small. In such cases, the application of the random signal may be performed in a state where the rotating machine 1 is stopped.

The parameter identification unit 5 converts transmission characteristics from the identification signal to the rotation speed signal and the steering torque signal, which are the response data, into frequency characteristics. A generally known method may be applied to calculate the frequency characteristics. For example, a spectral analysis method, a multi-decimation identification method, or a subspace method may be used. The parameter identification unit 5 can obtain frequency characteristics including gain characteristics and phase characteristics indicated by a Bode diagram as shown in FIG. 3.

Figure 3:
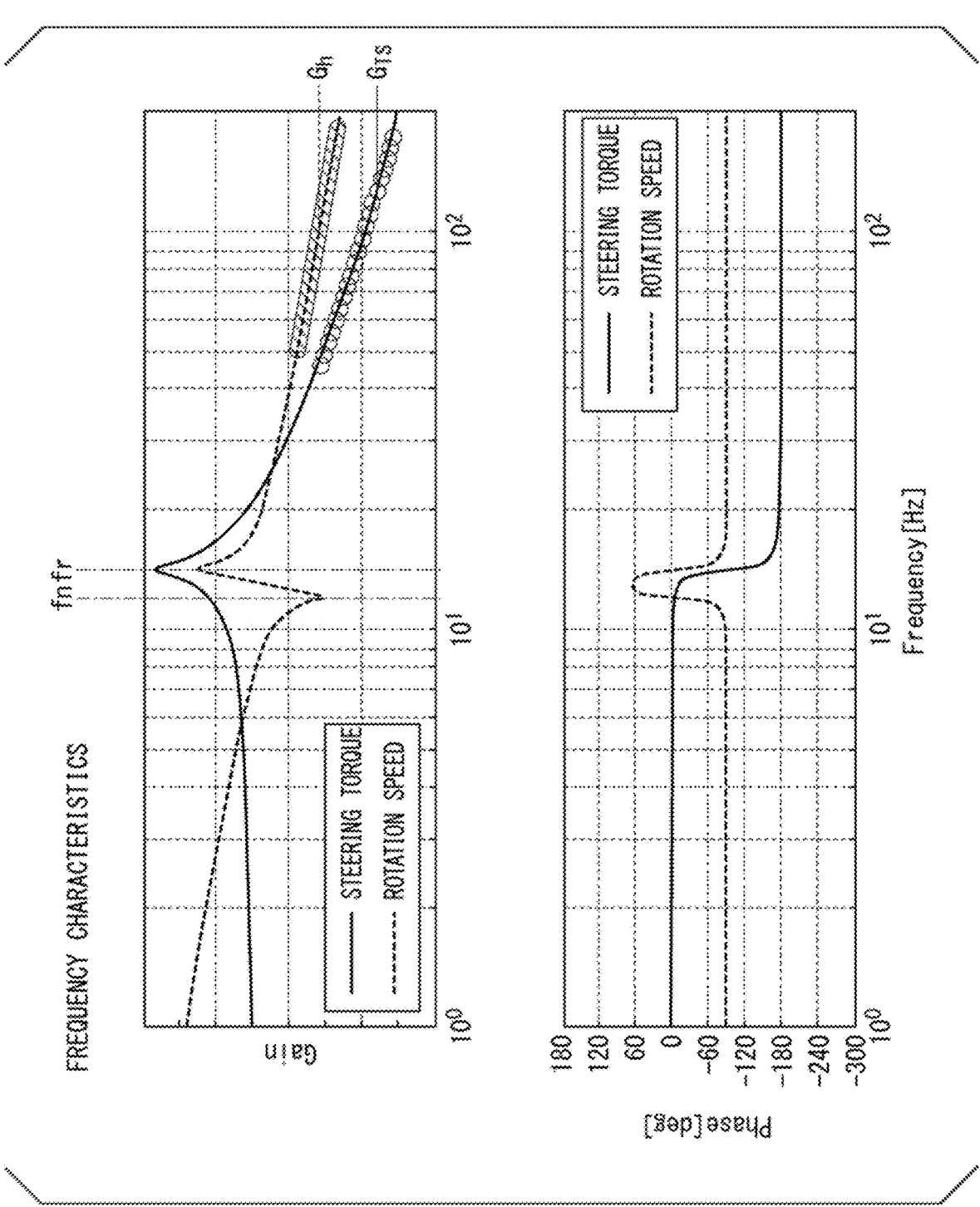
FIG. 3 A diagram showing frequency characteristics of response data to an identification signal in the first embodiment of the present disclosure.

FIG. 3 is a diagram showing the frequency characteristics of the response data to the identification signal in the first embodiment of the present disclosure. The frequency characteristics shown in FIG. 3 are obtained in a case where the subspace method is used, and a mathematical model such as a state equation or a transfer function can be obtained in addition to the Bode diagram. In a graph shown in an upper part of FIG. 3, a solid line waveform is a gain characteristic from an excitation torque to the steering torque, and a dashed line waveform is a gain characteristic from the excitation torque to the rotation speed. In addition, in a graph shown in a lower part of FIG. 3, a solid line waveform is a phase characteristic from the excitation torque to the steering torque, and a dashed line waveform is a phase characteristic from the excitation torque to the rotation speed.

In addition, as shown in FIG. 3, there are several feature amounts in the calculated frequency characteristics. The parameter identification unit 5 also calculates values of these feature amounts. For example, the parameter identification unit 5 calculates, as a resonance frequency fr, a frequency at which the solid line and dashed line waveforms have a local maximum peak in the graph in the upper part of FIG. 3, and calculates, as an anti-resonance frequency fn, a frequency at which the dashed line waveform has a local minimum peak.

Furthermore, the parameter identification unit 5 sets a representative point of a high-frequency section of the gain characteristic of the rotation speed surrounded by a frame in the graph shown in the upper part of FIG. 3 to, for example, 100 Hz, and calculates a gain at 100 Hz as a high-frequency gain $G_h$. The parameter identification unit 5 also calculates a gain at a representative point as a high-frequency gain $G_{TS}$ for a high-frequency section of the gain characteristic of the steering torque. The parameter identification unit 5 also outputs these feature amounts as a part of the frequency characteristics. Although a unit of the frequency is Hz, symbols of the frequency converted into rad/s are defined as a resonance frequency ωr and an anti-resonance frequency ωn.

It is known that the electric power steering device 50 can be approximated as a two-inertia system of a moment of inertia $J_m$ of the rotating machine 1 and a moment of inertia $J_{sw}$ of the steering wheel 51. Four parameters including these moments of inertia and a stiffness $K_s$ and a viscosity $C_s$ of the torsion bar between the two inertias are set as linear parameters to be identified. Among the feature amounts of the frequency characteristics calculated above, the resonance frequency fr and the anti-resonance frequency fn change in value due to a friction characteristic, which is the nonlinear element, while an influence of the nonlinear element on the high-frequency gain $G_h$ of the rotation speed and the high-frequency gain $G_{TS}$ of the steering torque is small. Therefore, by identifying the linear parameters from the high-frequency gain $G_h$ of the rotation speed and the high-frequency gain $G_{TS}$ of the steering torque, a part of the linear parameters can be identified with high accuracy without being affected by the nonlinear element.

Relationships between the linear parameters and the high-frequency gain $G_h$ of the rotation speed and the high-frequency gain $G_{TS}$ of the steering torque are derived from equations of motion of the two-inertia system as in Expressions (1) and (2) as follows. Here, $\omega_H = 2 \cdot \pi \cdot 100$ is set. The point at 100 Hz is selected as the high-frequency gain $G_h$, but a high frequency that is not affected by the peak may be used, and for example, a point in a frequency range of three times or more a peak frequency and equal to or less than an Nyquist frequency may be used. Alternatively, $G_h \times \omega_H$ in a predetermined interval in the range may be averaged, and Expression (1) below may be modified to $G_h \times \omega_H = 1/J_m$.

[Mathematical Expression 1]

$$G_h = \frac{1}{J_m \cdot \omega_H} \tag{1}$$

-continued

[Mathematical Expression 2]

$$G_{TS} = \frac{K_s}{J_m \cdot G_n \cdot \omega_H^2} \tag{2}$$

Here, $G_n$ in Expression (2) indicates a gear ratio.

Expressions (3) and (4) below are obtained from Expressions (1) and (2), and the moment of inertia $J_m$ of the rotating machine 1 and the stiffness $K_s$ of the torsion bar between the two inertias among the four unknown linear parameters can be identified without being affected by the nonlinear element.

[Mathematical Expression 3]

$$J_m = \frac{1}{G_h \cdot \omega_H} \tag{3}$$

[Mathematical Expression 4]

$$K_s = \frac{G_{TS} \cdot G_n \cdot \omega_H}{G_h} \tag{4}$$

Among the four unknown linear parameters, the moment of inertia $J_{sw}$ of the steering wheel 51 and the viscosity $C_s$ of the torsion bar between the two inertias, which are not identified in the above description, are identified after the identification of nonlinear parameters, which will be described later. After identifying the nonlinear parameters, random values are given to the unknown parameters of the model in the state of the moment of inertia $J_{sw}$ of the steering wheel 51 and the viscosity $C_s$ of the torsion bar between the two inertias among the linear parameters, and the steering torque and the rotation speed, which are response data to random input signals such as M-sequence signals, are calculated using Expressions (5) to (11) below.

The calculated steering torque and rotation speed are compared to time-series waveforms of the steering torque and the rotation speed detected by the torque detector 22 and the rotation detector 23, or frequency characteristic calculated from the time-series waveforms, or both. Then, values of the moment of inertia $J_{sw}$ of the steering wheel 51 and the viscosity $C_s$ of the torsion bar between the two inertias at which the calculated values and the detected values are closest to each other are identified by an optimization calculation. As an optimization calculation method, a generally known method (for example, a steepest descent method or a genetic algorithm) may be used. In particular, when a genetic algorithm such as a particle swarm optimization (PSO) method is used, there is an effect of reaching global optimization.

<<Identification of Nonlinear Parameter>>

Figure 4:
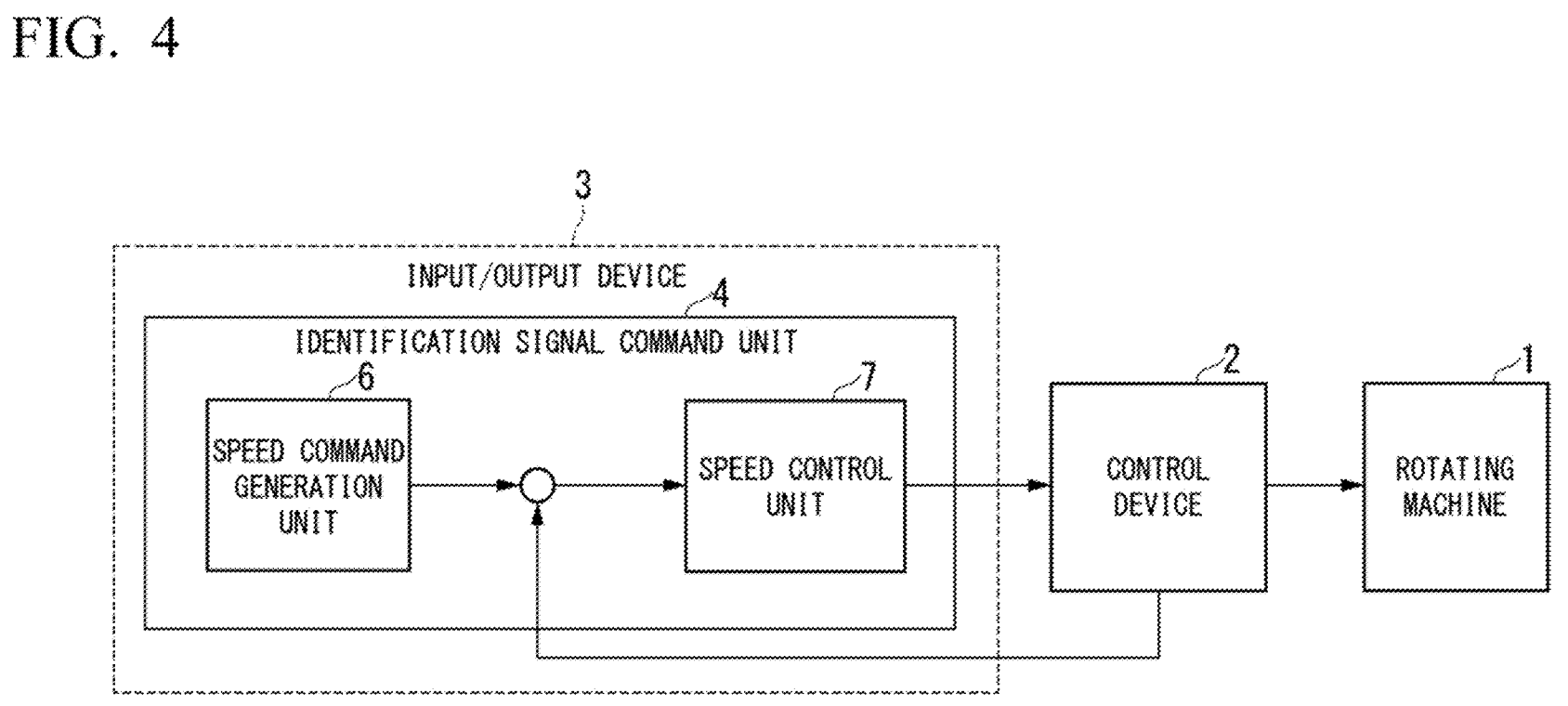

As the identification signal for identifying the nonlinear parameter, a signal for controlling the steering to pass through the same angle of the steering at different speed signs is used. FIG. 4 is a block diagram showing an internal configuration example of the identification signal command unit in the first embodiment of the present disclosure. As shown in FIG. 4, the identification signal command unit 4 includes a speed command generation unit 6 and a speed control unit 7, and the speed control unit 7 performs feedback control so that a speed command output from the speed command generation unit 6 and the rotation speed of the rotating machine 1 output from the control device 2 match each other. The speed control unit 7 performs the feedback control by using, for example, proportional-integral (PI) control used as a general feedback control law.

In addition, the speed command may be stored in advance in the speed command generation unit 6 or may be input to the speed command generation unit 6 from the outside of the input/output device 3. The identification signal command unit 4 sets the same value for the rotation speed command in a period of the same sign of the rotation speed command. This is to remove an element depending on a change in speed, and details will be described later. With the above configuration, it is possible to generate the signal for controlling the steering to pass through the same angle of the steering at different speed signs.

Figure 7:
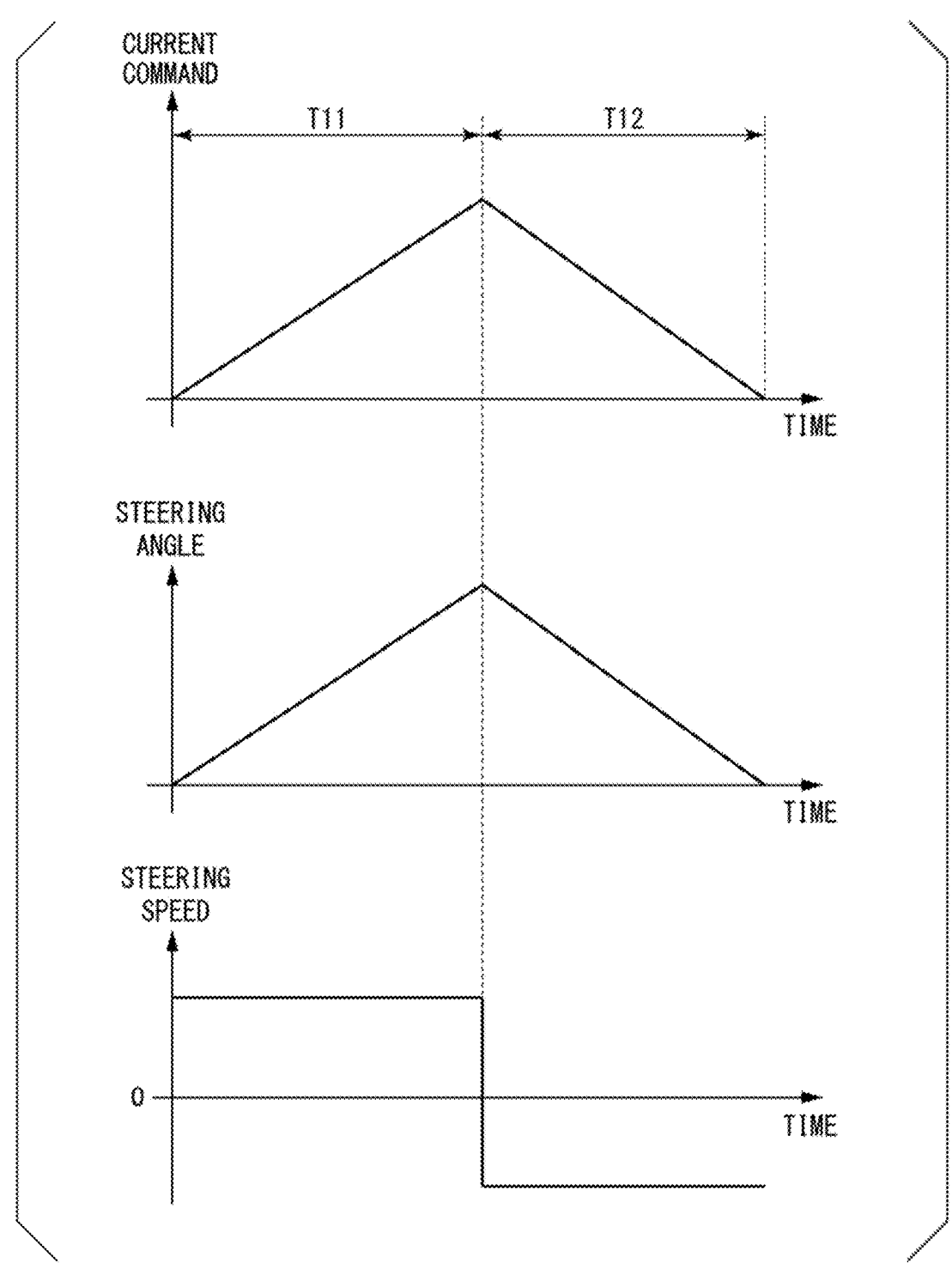
FIG. 7 A diagram showing a signal that changes in a ramp shape, which is used as the identification signal, in a third embodiment of the present disclosure.

By using the signal for controlling the steering to pass through the same angle of the steering at different speed signs, as shown in FIG. 7, hysteresis of an output torque with respect to the steering angle can be detected. By using the signal that gives the current command controlled so that the rotation speed is constant, rotation accelerations of the steering and the rotating machine 1 are close to 0. Furthermore, through measurement at a plurality of rotation speeds, an effect of extracting a term that depends on the rotation speed can be achieved.

When the electric power steering device 50 is represented as the two-inertia system and the wheel 55 is simplified and replaced with a leaf spring, the equations of motion are represented by Expressions (5) to (8) below.

[Mathematical Expression 5]

$$J_{sw}\dot{\omega}_h = T_h - T_1 \tag{5}$$

[Mathematical Expression 6]

$$J_m\dot{\omega}_m = T_m + \frac{T_1}{G_n} + \frac{T_2}{G_n} + X \tag{6}$$

[Mathematical Expression 7]

$$T_1 = C_S\left(\omega_h - \frac{\omega_m}{G_n}\right) + K_s\left(\theta_h - \frac{\theta_m}{G_n}\right) \tag{7}$$

[Mathematical Expression 8]

$$T_2 = -\left(C_{align}\frac{\omega_m}{G_n} + K_{align}\frac{\theta_m}{G_n}\right) \tag{8}$$

$\theta_h$: Steering angle
$\theta_m$: Rotating machine angle
$T_h$: Steering torque applied to the steering wheel by the steering operation
$T_m$: Output torque generated by the rotating machine
$K_{align}$: Leaf spring stiffness
$C_{align}$: Leaf spring viscosity
X: Friction element A relationship of Equation (9) below is established with respect to the steering torque $T_s$ detected by the torque detector 22.

[Mathematical Expression 9]

$$T_S = K_s\left(\theta_h - \frac{\theta_m}{G_n}\right) \tag{9}$$

The input signal corresponds to an output torque $T_m$ generated from the rotating machine 1, and the output signal corresponds to the steering torque $T_s$ detected by the torque detector 22 and the rotation speed $\theta_m$ detected by the rotation detector 23. In addition, the rotating machine angle $\theta_m$ can be calculated from the rotation speed $\omega_m$. The friction element needs to be set according to the configuration of the device, but in the present embodiment, friction elements $fric_1$ and $fric_2$ are used and set as in Expression (10) below.

[Mathematical Expression 10]

$$X = -\text{sign}(\omega_m) \cdot (fric_1 + fric_2 \cdot |T_m|) \tag{10}$$

Here, sign($\alpha$) is a function that returns "1" if a is positive and returns "−1" if $\alpha$ is negative. In a case where a portion where a time variation of a torque detection value is small, that is, a portion where $(\omega_h - \omega_m/G_n) \approx 0$ is extracted in a state where the signal that gives the current command controlled so that the rotation speed is constant or the ramp-shaped current command signal is given, Expression (11) below is obtained from Expressions (6) to (10).

[Mathematical Expression 11]

$$K_{align}\frac{\theta_m}{G_n^2} + C_{align}\frac{\omega_m}{G_n^2} + \text{sign}(\omega_m) \cdot (fric_1 + fric_2 \cdot |T_m|) = \tag{11}$$

$$T_m + T_s - J_m\dot{\omega}_m$$

A right-hand side of Expression (11) above can be calculated from the input and output signals and the moment of inertia $J_m$ of the rotating machine 1 that can be identified regardless of the nonlinear element in the identification of the linear parameter. In addition, in a case of the current command controlled so that the rotation speed is constant, a third term on the right-hand side of Expression (11) can be calculated to be substantially equal to 0. By using the input and output signals at N random times, Expression (12) below is obtained.

[Mathematical Expression 12]

$$J = \sum_{k=1}^{N}\left(K_{align}\frac{\theta_{mk}}{G_n^2} + C_{align}\frac{\omega_{mk}}{G_n^2} + \text{sign}(\omega_{mk}) \cdot (fric_1 + fric_2 \cdot |T_{mk}|)\right) - \tag{12}$$

$$(T_{mk} + T_{sk} - J_m\dot{\omega}_{mk})$$

In Expression (12), J is an evaluation function. The nonlinear parameters are identified by performing an optimization calculation with the leaf spring stiffness $K_{align}$, the leaf spring viscosity $C_{align}$, and the friction elements $fric_1$ and $fric_2$ as variables so that the evaluation function J is minimized. As an optimization calculation method, a generally known method may be applied in the same manner as in the case of the identification of the linear parameter.

Figure 5:
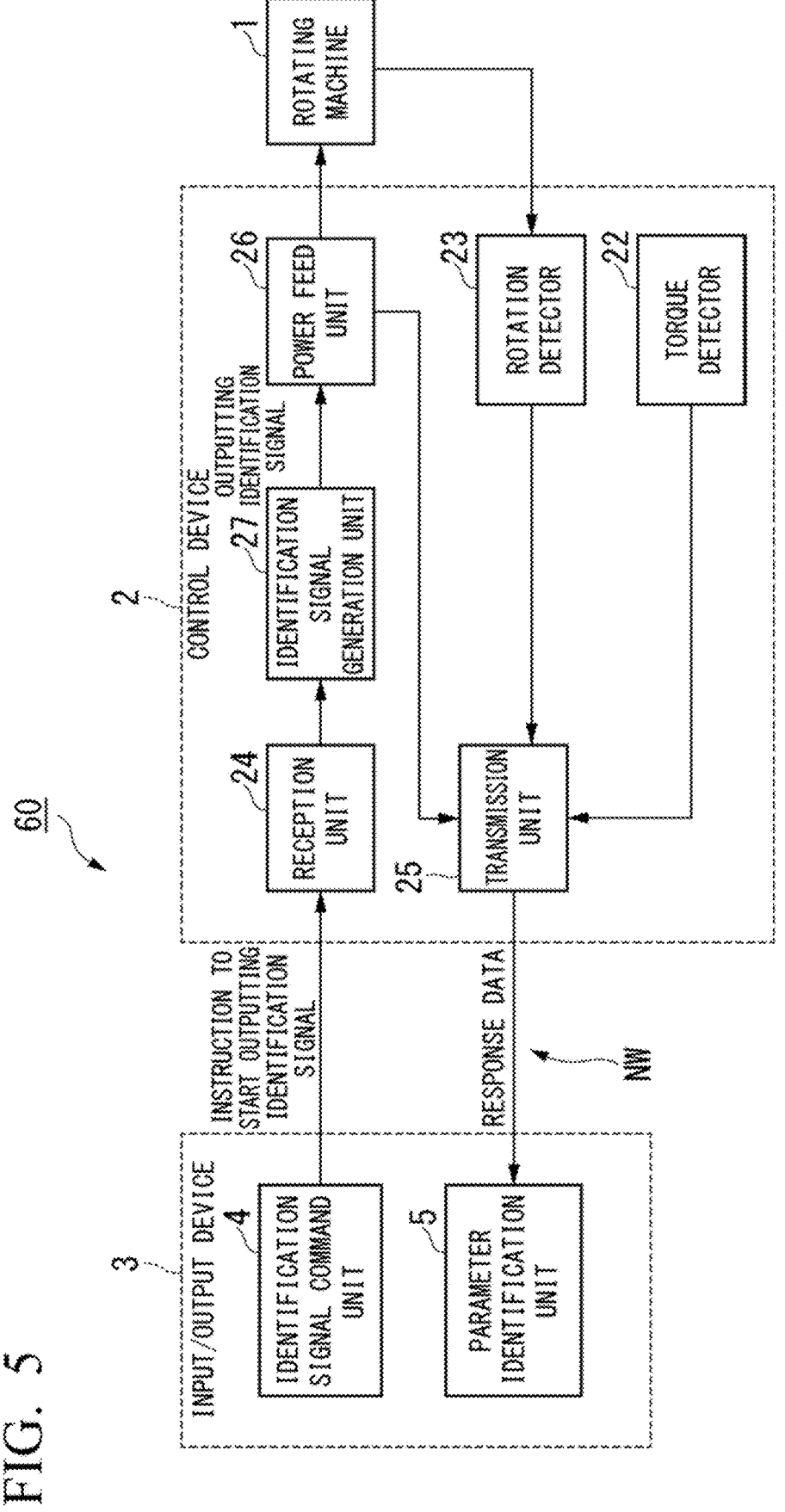
FIG. 5 A block diagram showing a modification example of the steering measurement device according to the first embodiment of the present disclosure.

FIG. 5 is a block diagram showing a modification example of the steering measurement device according to the first embodiment of the present disclosure. The steering measurement device 60 shown in FIG. 5 has a configuration in which the identification signal command unit 4 of the input/output device 3 outputs an instruction to start outputting the identification signal instead of the identification signal, and an identification signal generation unit 27 is added to the control device 2.

In the steering measurement device 60 shown in FIG. 1, the identification signal command unit 4 outputs the identification signal to the control device 2. Contrary to this, in the steering measurement device 60 shown in FIG. 5, the identification signal command unit 4 of the input/output device 3 outputs the instruction to start outputting the identification signal to the control device 2, and the identification signal generation unit 27 of the control device 2 generates the identification signal. The identification signal generated by the identification signal generation unit 27 includes the identification signal for the linear parameter and the identification signal for the nonlinear parameter.

As described above, in the present embodiment, the identification signal command unit 4 outputs the identification signal or an instruction signal for instructing to start outputting the identification signal to the electric power steering device 50. Then, the parameter identification unit 5 identifies the parameters of the electric power steering device 50 based on the response to the identification signal for identifying the linear parameter and the identification signal for identifying the nonlinear parameter, which are output when the steering is in a predetermined rotation state. Accordingly, it is possible to identify the nonlinear parameter that has not been identified by the method in the related art with high accuracy, in addition to the linear parameter that has been identified by the method in the related art. As a result, it is possible to realize an increase in accuracy of a desk-based analysis model for evaluating the characteristics of the electric power steering device 50.

In addition, since the identification signal for identifying the linear parameter is a signal including a predetermined power spectrum in a predetermined frequency band, the linear parameter can be identified within a short excitation time. In addition, since the identification signal for identifying the nonlinear parameter is a signal for controlling the steering to pass through the same angle of the steering at different speed signs, the hysteresis of the output torque with respect to the steering angle can be detected, and the nonlinear parameter can be identified with high accuracy.

Furthermore, in the present embodiment, the identification signal for identifying the nonlinear parameter is generated so that the detected rotation speed of the steering matches the speed command. Accordingly, even under a condition in which the friction characteristic, which is the nonlinear element, is large, the rotation speed can be controlled to be in a predetermined state, and a remarkable effect of identifying the nonlinear parameter with high accuracy can be obtained.

Second Embodiment

The steering measurement device 60 according to the first embodiment described above identifies the nonlinear parameters based on the equation of motion when the electric power steering device 50 is represented as the two-inertia system and the wheel 55 is simplified and replaced with the leaf spring. On the other hand, the steering measurement device 60 according to the present embodiment is different from the steering measurement device 60 according to the first embodiment in that the nonlinear parameters to be identified are switched depending on whether or not the electric power steering device 50 is in a state of being connected to the vehicle.

In general, a test for evaluating the performance of the electric power steering device 50 is often conducted in a state where the leaf spring is connected to the rack instead of the wheel 55. In such cases, the method of identifying the nonlinear parameters described in the first embodiment is effective. On the other hand, a situation in which the parameters of the electric power steering device 50 are identified in a state where the electric power steering device 50 is installed in an actual vehicle is also assumed.

The leaf spring is a device for simply simulating a road surface reaction force of the vehicle and has characteristics different from the actual road surface reaction force of the vehicle. Therefore, in the electric power steering device 50 mounted in the vehicle, in a case where the method of identifying the nonlinear parameters described in the first embodiment is applied, there is a problem in that reproduction accuracy of the road surface reaction force in the model used in the desk-based analysis is reduced. In the present embodiment, even in the state where the electric power steering device 50 is installed in the vehicle, the model used to evaluate the electric power steering device 50 can be realized by a highly accurate and simply calculation.

Since the characteristics of the road surface reaction force are changed in the state where the leaf spring is connected to the rack instead of the wheel 55 and in the state where the electric power steering device 50 is mounted in the actual vehicle, the linear parameters to be identified are the same, but the nonlinear parameters are different. Expressions (8) and (10) regarding to the road surface reaction force among Expressions (5) to (10) described in the identification of the nonlinear parameters of the first embodiment are changed.

Since there are various models that represent the road surface reaction force on actual vehicles, such as a Dahl model, a LuGre model, and a model that calculates a contact area of a tire according to steering and obtains the contact area from a friction coefficient, the models are selected according to an experimental environment or computer performance. In the present embodiment, Expressions (13), (14), and (15) below newly derived based on the LuGre model are used instead of Expression (8) described above.

[Mathematical Expression 13]

$$T_2 = -\left(\sigma_0 p + \sigma_1 \frac{\omega_m}{G_n}\right) \tag{13}$$

[Mathematical Expression 14]

$$\frac{dp}{dt} = \frac{\omega_m}{G_n} - \frac{\sigma_0 \left|\frac{\omega_m}{G_n}\right|}{\mu_1(\theta_m)} p, \quad (\theta_h \geq 0 \cap \omega_h \geq 0) \cup (\theta_h < 0 \cap \omega_h < 0) \tag{14}$$

[Mathematical Expression 15]

$$\frac{dp}{dt} = \frac{\omega_m}{G_n} - \frac{\sigma_0 \left|\frac{\omega_m}{G_n}\right|}{\mu_2} p, \quad (\theta_h \geq 0 \cap \omega_h < 0) \cup (\theta_h < 0 \cap \omega_h \geq 0) \tag{15}$$

Here, $\mu_1(\theta_m)$ is a function of the rotating machine angle $\theta_m$ and is represented by an exponential function or a polynomial. Here, a quadratic function represented by Expression (16) is used.

[Mathematical Expression 16]

$$\mu_1(\theta_m) = a_1 \theta_m^2 + \alpha_2 \theta_m + a_3 \tag{16}$$

Since the friction element is also modeled at the same time in Equations (13), (14), and (15) above, the friction element is not modeled separately. That is, the Expression (10) described above is changed to Expression (17) below.

[Mathematical Expression 17]

$$X = 0 \tag{17}$$

Expression (18) below is obtained from Expressions (6), (7), and (9) described above and Expressions (13) to (17) described above.

[Mathematical Expression 18]

$$\sigma_0 p + \sigma_1 \frac{\omega_m}{G_n} = T_m + T_s - J_m \dot{\omega}_m \tag{18}$$

As described above, the nonlinear parameters to be identified are vehicle road surface reaction force model parameters $\sigma_0$, $\sigma_1$, $\mu_1(\theta_m)$, and $\mu_2$ from the leaf spring stiffness $K_{align}$, the leaf spring viscosity $C_{align}$, and the friction elements $fric_1$ and $fric_2$. The identification signal used for identifying the nonlinear parameter is the same as that in the first embodiment. From Expression (18) above, Expression (19) below is obtained in the same manner as in the first embodiment by using the input and output signals at N random times.

[Formula 19]

$$J' = \sum_{k=1}^{N} \left( \sigma_0 p_k + \sigma_1 \frac{\omega_{mk}}{G_n} \right) - (T_{mk} + T_{sk} - J_m \dot{\omega}_{mk}) \tag{19}$$

In Expression (19) above, J' is an evaluation function. The nonlinear parameters can be identified by obtaining p from the input and output signals using Expressions (14) and (15) above with the vehicle road surface reaction force model parameters $\sigma_0$, $\sigma_1$, $\mu_1(\theta_m)$, and $\mu_2$ as variables and performing an optimization calculation so that the evaluation function J' is minimized. In addition, the vehicle road surface reaction force model parameters $\sigma_0$, $\sigma_1$, $\mu_1(\theta_m)$, and $\mu_2$ can also be identified in a stepwise manner instead of being obtained at once as described above.

Figure 6:
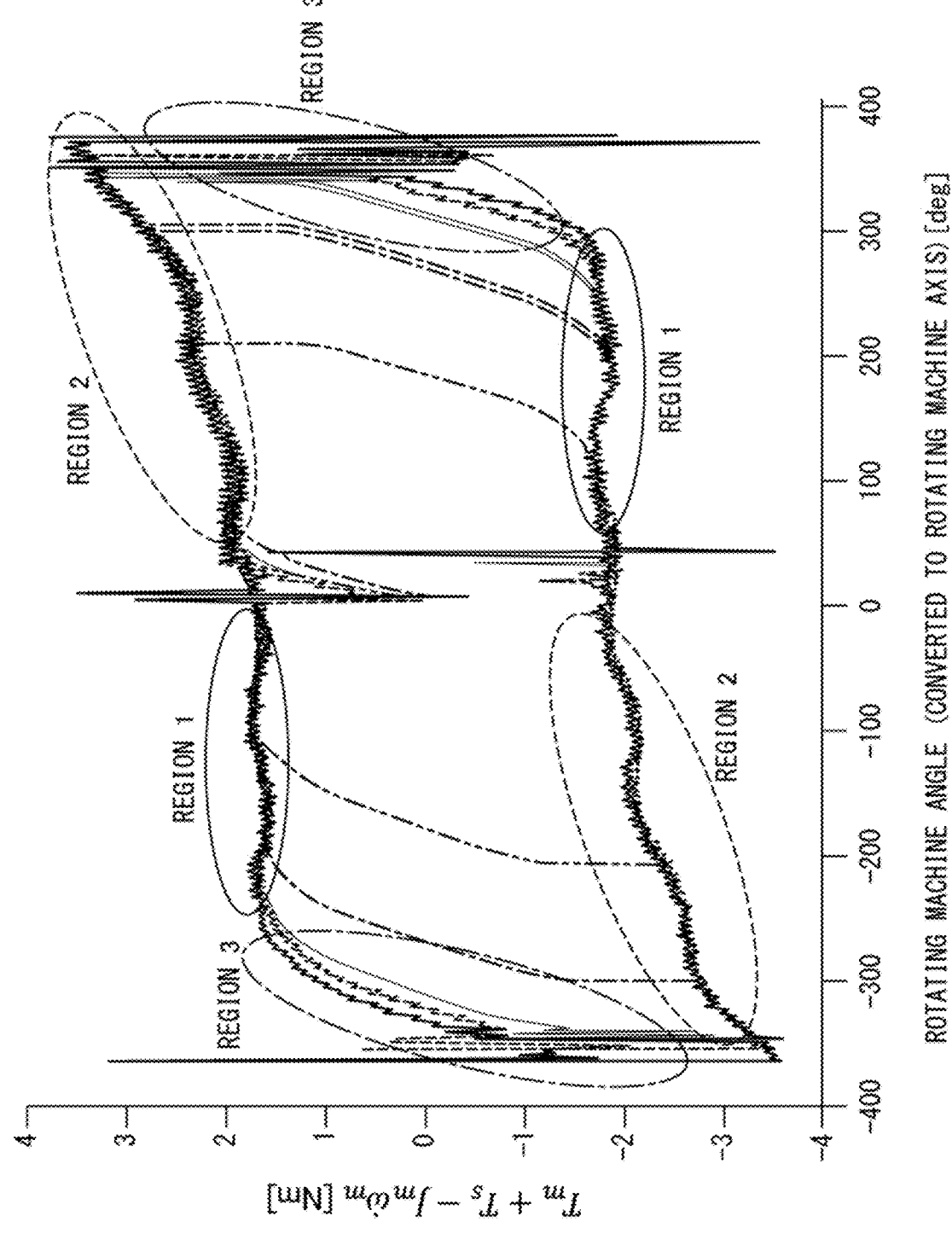
FIG. 6 A diagram showing a relationship between a rotating machine angle and a vehicle road surface reaction force in a second embodiment of the present disclosure.

FIG. 6 is a diagram showing a relationship between the rotating machine angle and the vehicle road surface reaction force in the second embodiment of the present disclosure. It should be noted that, in a graph shown in FIG. 6, the rotating machine angle (converted to rotating machine axis) is taken on a horizontal axis, and a value of a right-hand side of Expression (18) is taken on a vertical axis. Trajectories of the rotating machine angle and the road surface reaction force shown in FIG. 6 change in a clockwise direction from a state where the rotating machine angle and the road surface reaction force are 0. Then, the identification is performed in three separate regions ("region 1", "region 2", and "region 3").

"Region 1" is a region of $(\theta_h \geq 0 \cap \omega_h < 0) \cup (\theta_h < 0 \cap \omega_h \geq 0)$, in which a change in the right-hand side of Expression (18) is small.

"Region 2" is a region of $(\theta_h \geq 0 \cap \omega_h \geq 0) \cup (\theta_h < 0 \cap \omega_h < 0)$.

"Region 3" is a region switched between $(\theta_h \geq 0 \cap \omega_h \geq 0) \cup (\theta_h < 0 \cap \omega_h < 0)$ and $(\theta_h \geq 0 \cap \omega_h < 0) \cup (\theta_h < 0 \cap \omega_h \geq 0)$, during which "region 1" and "region 2" are switched.

First, in "region 1", a relationship of Expression (20) below is established.

[Mathematical Expression 20]

$$\mu_2 + \sigma_1 \frac{\omega_m}{G_n} = T_m + T_s - J_m \dot{\omega}_m \tag{20}$$

From Expression (20) above, Expression (21) below is obtained by using the input and output signals at N random times in "region 1".

[Mathematical Expression 21]

$$J'' = \sum_{k=1}^{N} \left( \mu_2 + \sigma_1 \frac{\omega_{mk}}{G_n} \right) - (T_{mk} + T_{sk} - J_m \dot{\omega}_{mk}) \tag{21}$$

In Expression (21) above, J'' is an evaluation function. By performing an optimization calculation using the vehicle road surface reaction force model parameters $\sigma_1$ and $\mu_2$ as variables so that the evaluation function J'' is minimized, $\sigma_1$ and $\mu_2$ can be identified. In "region 2", a relationship of Expression (22) below is established.

[Mathematical Expression 22]

$$\mu_1(\theta_m) = T_m + T_s - J_m \dot{\omega}_{mk} - \sigma_1 \frac{\omega_m}{G_n} \tag{22}$$

A right-hand side of Expression (22) above can be calculated from the input and output signals and an identification result of $\sigma_1$. Coefficients are obtained according to the way of expressing $\mu_1(\theta_m)$ by the least-squares method to fit the right-hand side of Expression (22). As shown in Expression (16) above, $\mu_1(\theta_m)$ is placed as a quadratic function. Therefore, polynomial approximation is performed by the least-squares method to fit the right-hand side of Expression (22), whereby coefficients of $\mu_1(\theta_m)$, a1, a2, and a3 are obtained.

Finally, in "region 3", $\sigma_0$ can be identified by obtaining p from the input and output signals using Expressions (14) and (15) described above with the vehicle road surface reaction force model parameter $\sigma_0$ as a variable, and performing an optimization calculation so that the evaluation function J' is minimized. Since identification accuracy of each of the nonlinear parameters to be identified can be checked and ranges of values from which the coefficients of the polynomial of $\mu_1(\theta_m)$ can be taken are wide, there is an effect that highly accurate identification can be performed by directly performing polynomial approximation.

As described above, by setting the nonlinear parameters according to the state in which the electric power steering device 50 is installed in the actual vehicle, there is an effect of identifying the nonlinear parameters with high accuracy. In addition, by identifying the nonlinear parameters with high accuracy, there is an effect of identifying with high accuracy the moment of inertia $J_{sw}$ of the steering wheel 51 and the viscosity $C_s$ of the torsion bar between the two inertias of the linear parameters, which are to be identified after the identification of the nonlinear parameters.

In the present embodiment, the example of switching the nonlinear parameters to be identified depending on whether or not the electric power steering device 50 is in a state of being connected to the vehicle has been described. However, a configuration may be adopted in which the identification signal for identifying the nonlinear parameter is switched. In a case where the electric power steering device 50 is connected to the vehicle, the parameters of the electric power steering device 50 may be identified not only in a state in which the vehicle is stopped but also in a state in which the vehicle travels.

Since the vehicle road surface reaction force changes between the stopped state and the travelling state of the vehicle, it is effective to use the identification signal suitable for the state in which the electric power steering device 50 is connected to the vehicle. As the identification signal suitable for the state connected to the vehicle, for example, there is an operation of changing an amplitude of a random signal, which is the identification signal for identifying the linear parameter, or a speed command used for the speed control when identifying the nonlinear parameter, according to a vehicle speed.

As described above, in the input/output device 3 according to the present embodiment, the parameter identification unit 5 switches the nonlinear parameters to be identified depending on whether or not the electric power steering device 50 is in a state of being connected to the vehicle. Accordingly, there is a significant effect of accurately identifying the road surface reaction force, which is the nonlinear parameter in the actual vehicle, and realizing an increase in the accuracy of the model used for evaluating the electric power steering device 50.

In addition, in the input/output device 3 according to the present embodiment, the identification signal command unit 4 may be configured to switch the identification signal depending on whether or not the electric power steering device 50 is in a state of being connected to the vehicle. Accordingly, there is an effect of generating an appropriate identification signal according to the travelling state of the vehicle and identifying the parameters of the electric power steering device 50 connected to the vehicle with high accuracy.

Furthermore, the input/output device 3 according to the present embodiment includes an exponential function or a polynomial relating to the state of the electric power steering device 50 in the nonlinear parameters. Accordingly, an effect of expressing the road surface reaction force of the actual vehicle by a simple approximation expression, and realizing the model used for evaluating the electric power steering device 50 with a highly accurate and simple calculation can be obtained.

Third Embodiment

In the steering measurement device 60 according to the first embodiment described above, the identification signal for identifying the nonlinear parameter is generated so that the detected rotation speed of the steering matches the speed command. Contrary to this, the steering measurement device 60 according to the present embodiment is different from the steering measurement device 60 according to the first embodiment in that a signal that changes in a ramp shape is used as the identification signal.

In a general electric power steering device 50, feedback control of detecting a rotation speed and generating a current command so that the rotation speed matches a speed command is not performed. Therefore, the method of identifying the nonlinear parameters described in the first embodiment requires the feedback control, which is not necessary for the mass-produced electric power steering device 50, and there is a concern that a software capacity increases. Therefore, in the present embodiment, a signal that changes in a ramp shape is used as the identification signal for the nonlinear parameters, and the identification of the nonlinear parameters is realized by a simple calculation.

FIG. 7 is a diagram showing a signal that changes in a ramp shape, which is used as the identification signal, in a third embodiment of the present disclosure. In FIG. 7, in addition to the identification signal, signals indicating the steering angle and the steering speed with respect to the identification signal are also shown. As shown in FIG. 7, the signal that changes in a ramp shape is a signal that changes at a constant rate with the passage of time. This signal needs to have a shape including both a positively increasing period T11 and a negatively increasing period T12 in order to pass through the same angle of the steering at different speed signs.

In addition, as a method of generating the signal that changes in a ramp shape, a method is considered in which a counter is counted up or counted down for each calculation cycle of the signal generation, and a result obtained by multiplying a count value by a predetermined gain is used as the identification signal. In the signal generation, it is not necessary to perform complicated calculation or operation processing in a short cycle, and the identification of the nonlinear parameters can be realized by simple signal generation processing compared to the case of using the feedback control of the rotation speed.

As described above, the input/output device 3 according to the present embodiment uses a ramp-shaped signal that changes at a constant rate with the passage of time as the identification signal for identifying the nonlinear parameter. Therefore, the feedback control of the rotation speed is not required, and a significant effect of identifying the nonlinear parameters with high accuracy only by simple signal generation processing is obtained.

Although the embodiments have been described above, the present disclosure is not limited to the above-described embodiments, and may be freely modified without departing from the gist of the present disclosure. For example, the electric power steering device 50 described in the above-described embodiment is of a rack-and-pinion type, but may be of a type other than the rack-and-pinion type.

Each of the configurations (the control device 2 and the input/output device 3) provided in the steering measurement device 60 described above has a computer system therein. Moreover, a program for implementing functions of each configuration provided by the steering measurement device 60 described above may be recorded on a computer-readable recording medium, and by having the computer system read and execute the program recorded on this recording medium, processing in each configuration provided in the steering measurement device 60 described above may be performed. Here, "having the computer system read and execute the program recorded on the recording medium" includes installing the program on the computer system. Here, the "computer system" mentioned here includes an operating system (OS) and hardware such as a peripheral device.

In addition, the "computer system" may include a plurality of computer devices connected via a network including a communication line such as the Internet, a WAN, a LAN, and a dedicated line. In addition, the "computer-readable recording medium" refers to a portable medium such as a flexible disk, a magneto-optical disk, a ROM, or a CD-ROM, and a storage device such as a hard disk built in a computer system. As described above, the recording medium on which the program is stored may be a non-transitory recording medium such as a CD-ROM.

In addition, the recording medium also includes an internal or external recording medium that is accessible by a distribution server to distribute the program. In addition, a configuration may be adopted in which the program is divided into a plurality of programs and the plurality of programs are downloaded at different times and then combined in each configuration provided by the steering measurement device 60, or the distribution server that distributes each of the divided programs may be different. Furthermore, the "computer-readable recording medium" also includes a medium that holds the program for a certain period of time, such as a volatile memory (RAM) inside the computer system that serves as a server or a client in a case where the program is transmitted via a network. In addition, the program may be a program for implementing some of the functions described above. Furthermore, the program may be a so-called difference file (difference program) capable of implementing the functions described above in combination with a program that has already been recorded on the computer system.

REFERENCE SIGNS LIST

1: Rotating machine
2: Control device
3: Input/output device
4: identification signal command unit
5: parameter identification unit
27: identification signal generation unit
50: Electric power steering device
60: Steering measurement device
NW: In-vehicle communication network

The invention claimed is:

1. An input/output device comprising:

an identification signal command circuitry configured to output, to an electric power steering device that adds a steering assist force to a steering provided in a vehicle, an identification signal for identifying a parameter of the electric power steering device, or an instruction signal that instructs the electric power steering device to start outputting the identification signal; and a parameter identification circuitry configured to identify the parameter of the electric power steering device from a response of the electric power steering device to the identification signal, wherein the parameter identification circuitry identifies the parameter of the electric power steering device based on a response to a first identification signal for identifying a linear parameter and a second identification signal for identifying a nonlinear parameter, which are output when the steering is in a predetermined rotation state.

2. The input/output device according to claim 1, wherein the first identification signal is a signal including a predetermined power spectrum in a predetermined frequency band, and the second identification signal is a signal for controlling the steering to pass through the same angle of the steering at different speed signs.

3. The input/output device according to claim 2, wherein the identification signal command circuitry controls the speed sign of the steering to be the same when the first identification signal is applied.

4. The input/output device according to claim 2, wherein the second identification signal is generated so that a detected rotation speed of the steering matches a speed command.

5. The input/output device according to claim 2, wherein the second identification signal is a ramp-shaped signal that changes at a constant rate with passage of time.

6. The input/output device according to claim 1, wherein the parameter identification circuitry switches the nonlinear parameter to be identified depending on whether or not the electric power steering device is in a state of being connected to the vehicle.

7. The input/output device according to claim 1, wherein the identification signal command circuitry switches the identification signal depending on whether or not the electric power steering device is in a state of being connected to the vehicle.

8. The input/output device according to claim 1, wherein the nonlinear parameter includes an exponential function or a polynomial related to a state of the electric power steering device.

9. A steering measurement device comprising:

the input/output device according to claim 1; and a controlling circuitry configured to be connected to the input/output device via an in-vehicle communication network provided in the vehicle, to control a rotating machine provided in the electric power steering device to add a steering assist force to the steering based on the first identification signal or the second identification signal, and to output response data indicating a response of the electric power steering device to the first identification signal or the second identification signal to the input/output device via the in-vehicle communication network.

10. The steering measurement device according to claim 9, wherein the controlling circuitry includes an identification signal generation circuitry that outputs the first identification signal or the second identification signal based on the instruction signal output from the identification signal command circuitry of the input/output device.

\* \* \* \* \*